Dec. 15, 1942.   B. W. JONES   2,305,219
ENGINE STARTER GEARING
Filed Oct. 31, 1940

INVENTOR.
Burr W. Jones
BY Clinton S. Janu
ATTORNEY.

Patented Dec. 15, 1942

2,305,219

UNITED STATES PATENT OFFICE 2,305,219

ENGINE STARTER GEARING

Burr W. Jones, Elmira Heights, N. Y., assignor to Bendix Aviation Corporation, South Bend, Ind., a corporation of Delaware Application October 31, 1940, Serial No. 363,693

6 Claims. (Cl. 74—6)

The present invention relates to engine starter gearing and more particularly to manually or mechanically controllable gearing for connecting a starting motor to a member of an engine to be started.

It is an object of the present invention to provide a novel starter gear shift which is efficient and reliable in operation while being simple and economical in construction.

It is another object to provide such a device incorporating a positive type of overrunning clutch for permitting the engine member to overrun the starting motor when the engine starts.

It is another object to provide such a device having effective and dependable controlling means for the overrunning clutch.

It is another object to provide such a device having special provisions for engaging the clutch in case of tooth abutment between the starting pinion and engine gear.

Further objects and advantages will be apparent from the following description taken in connection with the accompanying drawing in which.

Figure 1:
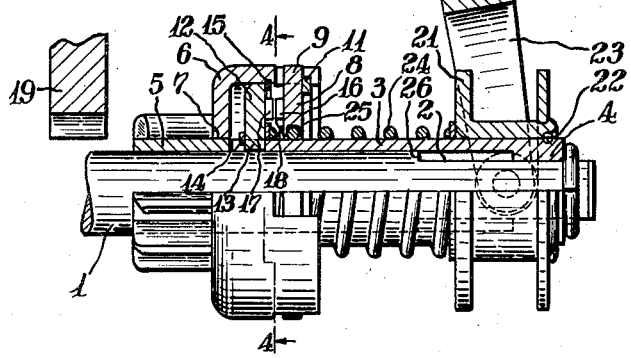
Fig. 1 is a side elevation partly in section of a preferred embodiment of the invention.
Figure 2:
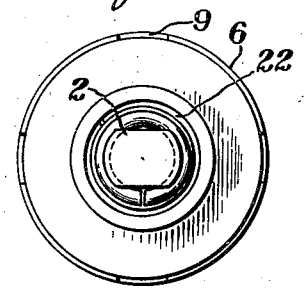
Fig. 2 is an end view of the shift from the right in Fig. 1.
Figure 3:
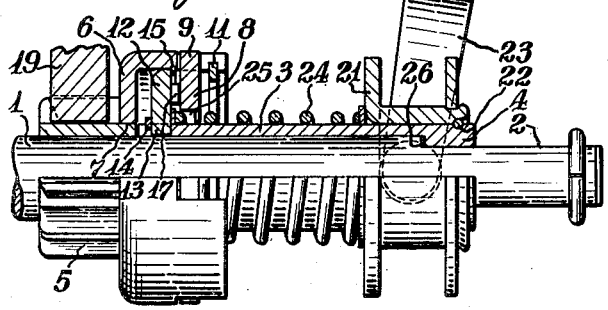
Fig. 3 is a view similar to Fig. 1 showing the parts in cranking position.

In Fig. 1 of the drawing there is illustrated a power shaft 1 which may be the extended armature shaft of a starting motor, not illustrated. The free end of the power shaft is formed with a "double-D" section 2, and a sleeve 3 is slidably journalled on the power shaft and is provided with a drive head 4 having an opening conforming to the "double-D" of the power shaft so as to form in effect a splined connection between the power shaft and sleeve.

A pinion 5 is slidably journalled on the power shaft and is connected for rotation by the sleeve 3 through an over-running clutch. As here shown, this is accomplished by means of a barrel member 6 rigidly connected to the pinion as indicated at 7 and having a driven clutch member 8 loosely splined therein as indicated at 9. A split ring 11 is provided for confining the clutch member 8 in the end of the barrel. A driving clutch member 12 is fixed in any suitable manner as indicated at 13 on the end of the sleeve 3, and is locked thereon by means of a split lock ring 14. The driving clutch member 12 fits loosely within the barrel 6 and is prevented from longitudinal movement therein by means of a split thrust ring 15 so positioned as to maintain the pinion 5 in abutting relation with the adjacent end of the sleeve 3.

Figure 4:
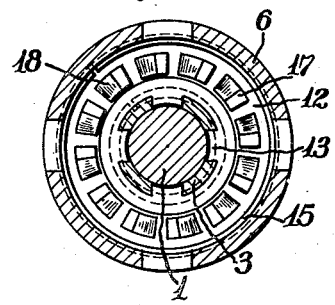
Fig. 4 is a section taken substantially on the line 4—4 of Fig. 1.
Figure 5:
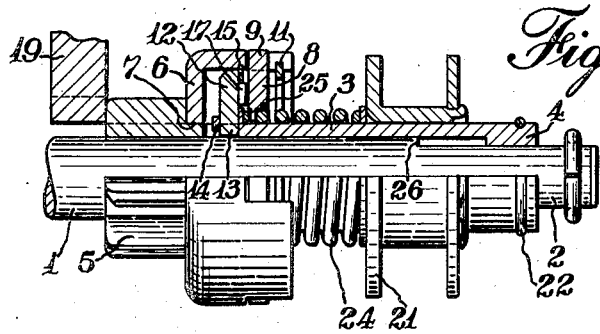
Fig. 5 is a view similar to Fig. 1 showing the parts in the positions assumed in case of tooth abutment between the pinion and engine gear.

Clutch members 8 and 12 are provided with projections 16 and 17 respectively, adapted to engage and transmit rotation positively. These projections are preferably beveled off on their non-driving sides as indicated at 18 (Fig. 4) so as to permit the driven clutch member to overrun the driving clutch member when the rotary speed of the pinion 5 exceeds that of the power shaft 1.

Means for shifting the pinion 5 into and out of engagement with a member such as a ring gear 19 of the engine to be started and for controlling the overrunning clutch, is provided comprising a shift collar 21 slidably mounted on the sleeve 3 and retained thereon by means of a lock ring 22, a yoke 23 for actuating the shift collar, and a spring 24 mounted on the sleeve 3 under a small amount of compression between the shift collar 21 and the driving clutch member 12. The shift collar is normally maintained against the lock ring 22 by the spring 24, and motion of the shift collar to the left is transmitted yieldably through said spring to the driving clutch member 12 and thence to the sleeve 3 and pinion 5.

According to the present invention, the driven clutch member 8 is provided with an internal helical groove 25 adapted to loosely receive the spring 24 whereby the spring forms a yielding threaded connection between the driven clutch member and the sleeve 3. This yielding threaded connection is effective to move the driven clutch into and out of engagement with the driving clutch by relative rotation between the sleeve and driven clutch, and is further effective upon compression of the spring 24 to move the driven clutch directly into engagement with the driving clutch.

In operation, starting with the parts in the positions illustrated in Fig. 1, shifting of the collar 21 to the left by means of the shift fork 23 causes the sleeve 3 and pinion 5 to be moved to the left by means of the spring 24 until the pinion 5 engages the engine gear 19, at which time longitudinal motion of the sleeve is arrested by the shoulder 26 formed at the end of the "double-D" section 2 of the power shaft 1. Rotation of the power shaft by the starting motor thereupon causes sleeve 3 and driving clutch member 12 to rotate, and the consequent rotation of the spring 24 causes the driven clutch member 8 to engage the driving clutch member 12, whereupon the rotation of the driving clutch member is transmitted through the driven clutch member and the barrel 6 to the pinion 5 to crank the engine. When the engine starts, the acceleration of the engine gear causes the pinion 5 to overrun the power shaft whereby the driven clutch member 8 threads itself back on the spring 24, thus disconnecting itself from the driving clutch 12. The pinion 5 is then free to overrun until it is drawn out of mesh by the return of the shift fork 23 to idle position.

If, during the meshing operation, a tooth of the pinion 5 should abut against a tooth of the engine gear 19 so as to arrest the longitudinal movement of the pinion, further movement of the shift collar 21 will compress the spring 24, which compression will cause the driven clutch member 8 to be moved longitudinally into driving engagement with the driving clutch member 12. Thereafter, energization of the starting motor causes rotation of the power shaft 1 which will be transmitted through the sleeve 3 and the clutch members to the pinion 5 to index it into proper registry with the tooth spaces of the engine gear. The spring 24 can then expand and snap the pinion into initial mesh with the engine gear, after which engagement and cranking take place as usual.

Although but one embodiment of the invention has been shown and described in detail, it will be understood that other embodiments are possible and various changes may be made in the design and arrangement of the parts without departing from the spirit of the invention as defined in the claims appended hereto.

What is claimed is:

1. In an engine starter, a power shaft, a sleeve slidably but non-rotatably mounted thereon, a clutch member fixed on the sleeve, a pinion slidably and rotatably mounted on the power shaft, a second clutch member, means connecting the second clutch member to the pinion for rotation therewith, a yielding spiral member on the sleeve having an inclined connection with the second clutch member, and means for applying endwise pressure to the yielding spiral member for moving the sleeve along the shaft.

2. In an engine starter, a power shaft, a sleeve slidably but non-rotatably mounted thereon, a clutch member fixed on the sleeve, a pinion slidably and rotatably mounted on the power shaft, a second clutch member, means connecting the second clutch member to the pinion for rotation therewith, a spiral spring frictionally mounted on the sleeve having a threaded connection with the second clutch member, and means for applying endwise pressure to the spring to slide the sleeve along the shaft.

3. In an engine starter, a power shaft, a sleeve slidably but non-rotatably mounted thereon, a clutch member fixed on the sleeve, a spiral spring frictionally mounted on the sleeve, a pinion slidably journalled on the power shaft, a second clutch member threaded on the spring, means connecting the second clutch member to the pinion for rotation therewith with freedom for limited relative longitudinal movement, and means for applying endwise pressure to the spring to slide the pinion into engagement with a member of an engine to be started.

4. In an engine starter, a power shaft, a sleeve splined thereon, a clutch member fixed adjacent one end of the sleeve, a shifting collar slidably mounted on the sleeve adjacent the other end thereof, a spiral spring confined on the sleeve between the clutch member and collar, a second clutch member threaded on the spring adjacent the first clutch member and movable to close the clutch by compression of said spring, a pinion slidably journalled on the power shaft, and means connecting the pinion to the second clutch member for rotation in unison.

5. In a starter gear, a power shaft, a sleeve splined thereon, a clutch member fixed rigidly on one end of the sleeve, a second clutch member loosely mounted on the sleeve adjacent thereto, a pinion, means providing a positive rotary connection between the pinion and the second clutch member with freedom for limited relative longitudinal movement, and yielding means for shifting the sleeve to engage the pinion with a member of an engine to be started and for simultaneously controlling the engagement of the clutch members.

6. A starter gear as set forth in claim 5 in which the pinion is mounted in abutting relation to the end of the sleeve, and the connection between the second clutch member and the pinion provides sufficient lost motion to permit the clutch members to engage when longitudinal movement of the pinion is obstructed.

BURR W. JONES.